(12) United States Patent
Ishijima et al.

(10) Patent No.: US 7,731,292 B2
(45) Date of Patent: Jun. 8, 2010

(54) SEAT BACK FRAME FOR A VEHICLE

(75) Inventors: Takahiro Ishijima, Aichi (JP); Kouji Kaneda, Toyota (JP)

(73) Assignees: Toyota Jidosha Kabushiki Kaisha, Toyota-shi, Aichi-ken (JP); Toyota Boshoku Kabushiki Kaisha, Kariya-shi, Aichi (JP)

( * ) Notice: Subject to any disclaimer, the term of this patent is extended or adjusted under 35 U.S.C. 154(b) by 0 days.

(21) Appl. No.: 12/293,876

(22) PCT Filed: Mar. 20, 2007

(86) PCT No.: PCT/JP2007/056516

§ 371 (c)(1),
(2), (4) Date: Sep. 22, 2008

(87) PCT Pub. No.: WO2007/111340

PCT Pub. Date: Oct. 4, 2007

(65) Prior Publication Data

US 2009/0108661 A1    Apr. 30, 2009

(30) Foreign Application Priority Data

Mar. 23, 2006  (JP) .............................. 2006-081149

(51) Int. Cl.
*B60N 2/42*   (2006.01)
*B60N 2/427*  (2006.01)

(52) U.S. Cl. .............................. 297/452.18; 297/216.1; 297/216.13; 297/216.14

(58) Field of Classification Search ............ 297/452.18, 297/452.2, 216.1, 216.13, 216.14
See application file for complete search history.

(56) References Cited

U.S. PATENT DOCUMENTS

| 4,544,204 | A | * | 10/1985 | Schmale | ................ | 297/452.18 |
| 4,588,228 | A | * | 5/1986 | Nemoto | ................ | 297/452.18 |
| 4,695,097 | A | * | 9/1987 | Muraishi | ............... | 297/452.18 |
| 4,804,226 | A | * | 2/1989 | Schmale | ................ | 297/216.13 |

(Continued)

FOREIGN PATENT DOCUMENTS

DE    32 39 292 A1    5/1983

(Continued)

*Primary Examiner*—Rodney B White
(74) *Attorney, Agent, or Firm*—Finnegan, Henderson, Farabow, Garrett & Dunner, LLP

(57) ABSTRACT

At a side portion 22 of a seat back frame, not only does a rear first extending portion 52 bend and extend from a frame side plate portion 30 toward a seat back inner side at an obtuse angle, but also, in a vicinity of a central portion of a rear flange portion 50, a rear second extending portion 54 bends and extends from the rear first extending portion 52 further toward the seat back inner side. Therefore, even if a relatively large load toward a rear of a vehicle acts on the seat back frame and compressive stress is generated at an intermediate portion of the rear flange portion 50 in a heightwise direction of a seat back, it is difficult for cross-sectional collapsing to arise, and the load can be effectively supported at the frame side plate portion 30. There can be provided a seat back frame for a vehicle which can suppress an amount of bending deformation at the time of a rear collision, without leading to an increase in weight.

6 Claims, 3 Drawing Sheets

U.S. PATENT DOCUMENTS

| | | | |
|---|---|---|---|
| 5,044,693 A * | 9/1991 | Yokota | 297/452.18 |
| 5,131,721 A * | 7/1992 | Okamoto | 297/452.18 |
| 5,423,593 A * | 6/1995 | Nagashima | 297/284.4 |
| 5,490,718 A * | 2/1996 | Akizuki et al. | 297/452.18 X |
| 5,547,259 A * | 8/1996 | Fredrick | 297/452.18 |
| 5,645,316 A * | 7/1997 | Aufrere et al. | 297/452.2 X |
| 5,671,976 A * | 9/1997 | Fredrick | 297/452.18 |
| 6,024,406 A * | 2/2000 | Charras et al. | 297/216.14 |
| 6,048,033 A * | 4/2000 | Sakurai et al. | 297/452.18 |
| 6,082,823 A * | 7/2000 | Aumont et al. | 297/452.2 |
| 6,132,003 A * | 10/2000 | Sakurai et al. | 297/452.18 |
| 6,286,902 B1 * | 9/2001 | Yoshimura | 297/452.18 |
| 6,375,267 B1 * | 4/2002 | Ishikawa | 297/452.18 |
| 6,523,892 B1 * | 2/2003 | Kage et al. | 297/216.13 |
| 6,702,387 B2 * | 3/2004 | Munemura et al. | 297/452.18 |
| 7,070,236 B2 * | 7/2006 | Kawashima | 297/216.14 |
| 7,163,261 B2 * | 1/2007 | Kawashima | 297/216.14 |
| 7,234,769 B2 * | 6/2007 | Takenaka et al. | 297/216.12 |
| 7,284,794 B2 * | 10/2007 | Yamaguchi et al. | 297/216.12 |
| 7,284,800 B2 * | 10/2007 | Ishizuka | 297/452.18 |
| 7,290,837 B2 * | 11/2007 | Sugiyama et al. | 297/452.55 |
| 7,469,967 B1 * | 12/2008 | Hori et al. | 297/452.18 |
| 7,488,035 B2 * | 2/2009 | Kawashima et al. | 297/216.14 |
| 7,530,633 B2 * | 5/2009 | Yokota et al. | 297/216.12 |
| 7,575,278 B2 * | 8/2009 | Wissner et al. | 297/284.4 |
| 2005/0077763 A1 * | 4/2005 | Kawashima | 297/216.14 |
| 2007/0152489 A1 * | 7/2007 | Ishizuka | 297/452.18 X |

FOREIGN PATENT DOCUMENTS

| | | | |
|---|---|---|---|
| DE | 4209391 A1 * | 10/1992 | 297/452.18 |
| EP | 1 193 119 | 4/2002 | |
| JP | 06070827 A * | 3/1994 | 297/452.18 |
| JP | 8-112160 | 5/1996 | |
| JP | 11-32865 | 2/1999 | |
| JP | 2001-71802 | 3/2001 | |

* cited by examiner

SEAT BACK FRAME FOR A VEHICLE

TECHNICAL FIELD

The present invention relates to a seat back frame for a vehicle which is disposed in a seat back for a vehicle.

BACKGROUND TECHNOLOGY

In a seat back frame for a vehicle, there are cases in which a frame in which a plate member is made to have a U-shaped, open cross-sectional configuration (the cross-sectional configuration has an open portion) is applied. In such a frame, in order to suppress the amount of bending deformation at the time of a rear collision, flat tube portions or reinforcing members are mounted to the vertical frame (see, for example, Japanese Patent Application Laid-Open (JP-A) No. 11-32865).

However, in this conventional seat back frame for a vehicle, the problem arises that an increase in the number of parts leads to an increase in weight.

DISCLOSURE OF THE INVENTION

In view of the above-described facts, the subject of the present invention is to provide a seat back frame for a vehicle which can suppress the amount of bending deformation at the time of a rear collision, without leading to an increase in weight.

A seat back frame for a vehicle of a first aspect of the present invention is a seat back frame for a vehicle in which a side portion (side frame), which is disposed in a transverse direction side portion at a seat back, has a frame side plate portion which makes a plane including a front-back direction of a seat be a general plane, i.e., which generally includes a plane which is parallel to the front-back direction of the seat, and flange portions extending toward a seat back inner side from a front end portion and a rear end portion of the frame side plate portion respectively, wherein at least one of the front and rear flange portions has a first extending portion bent at an obtuse angle from the frame side plate portion toward the seat back inner side and extending to a vicinity of a central portion of the flange portion, and a second extending portion bending and extending from the first extending portion toward the seat back inner side.

In accordance with the seat back frame for a vehicle of the above-described aspect of the present invention, not only does the first extending portion bend and extend from the frame plate side portion toward the seat back inner side at an obtuse angle, but also, at a vicinity of the central portion of the flange portion, the second extending portion bends and extends from the first extending portion further toward the seat back inner side. Therefore, even if a relatively large load toward the rear of the vehicle acts on the seat back frame and stress arises at the flange portion such as compressive stress arises at the intermediate portion of the rear flange portion in the seat back heightwise direction or the like, it is difficult for cross-sectional collapsing to arise, and the load can be effectively supported at the frame side plate portion. In this way, the amount of bending deformation at the time of a rear collision can be suppressed merely by changing the configuration of the seat back frame, without mounting a reinforcing member or the like.

Namely, in accordance with the seat back frame for a vehicle of the above-described aspect of the present invention, there is the excellent effect that the amount of bending deformation at the time of a rear collision can be suppressed without leading to an increase in weight.

The structure of the above-described aspect of the present invention has the feature that at least one of the front and rear flange portions has the first extending portion and the second extending portion, and extends such that an angle formed by the frame side plate portion and an imaginary line, which connects a distal end portion of the flange portion and a bent inner side portion from the frame side plate portion toward the flange portion, is an obtuse angle.

In accordance with the seat back frame for a vehicle of the above-described structure, at least one of the front and rear flange portions has the first extending portion and the second extending portion, and extends such that an angle formed by the frame side plate portion and an imaginary line, which connects a distal end portion of the flange portion and a bent inner side portion from the frame side plate portion toward the flange portion, is an obtuse angle. Therefore, the rigidity, at at least one of the front and rear flange portions, with respect to bending deformation toward the frame side plate portion is high, and, even if a relatively large load toward the rear of the vehicle acts on the seat back frame and stress (tensile stress in the case of the front flange portion, and compressive stress in the case of the rear flange portion) arise at the intermediate portion of the flange portion in the seat back heightwise direction, it is difficult for the flange portion to bendingly deform toward the frame side plate portion.

Namely, in accordance with the seat back frame for a vehicle of the above-described structure, because it is difficult for at least one of the front and rear flange portions to bendingly deform toward the frame side plate portion, as a result, there is the excellent effect that the amount of bending deformation of the entire seat back frame at the time of a rear collision can be suppressed.

BEST MODE FOR CARRYING OUT THE INVENTION

Figure 1:
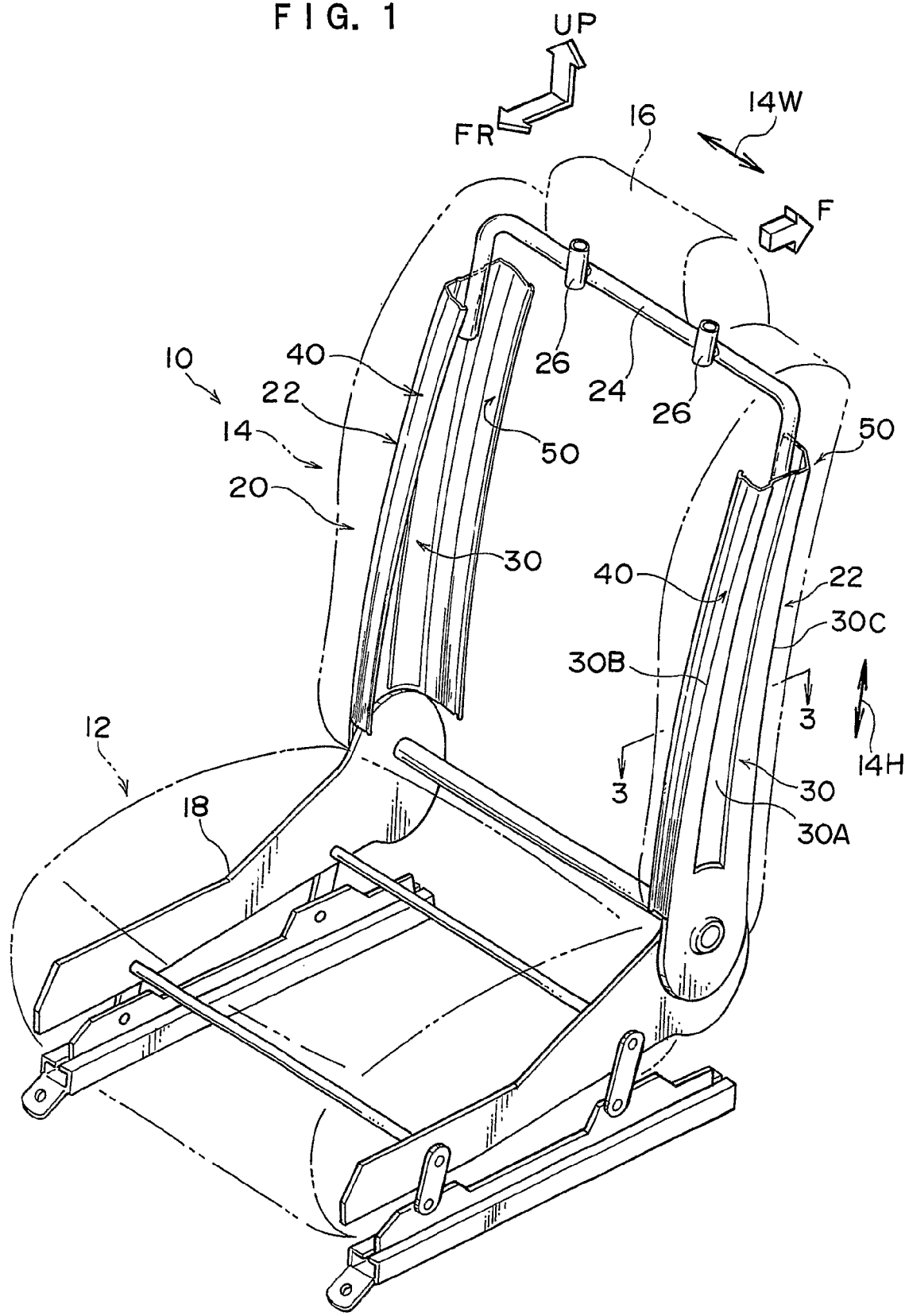
FIG. 1 is a perspective view showing a seat for a vehicle to which a seat back frame for a vehicle relating to an embodiment of the present invention is applied.

An embodiment of a seat back frame for a vehicle in the present invention will be described on the basis of the drawings. Note that arrow UP in the drawings indicates the upward direction of the vehicle, and arrow FR indicates the frontward direction of the vehicle.

Structure Of Embodiment

A frame perspective view of a seat 10 for a vehicle is shown in FIG. 1. As shown in FIG. 1, the seat 10 for a vehicle is structured to include a seat cushion 12 which supports the buttocks of a vehicle occupant; a seat back 14 which is supported at the rear end portion of the seat cushion 12 so as to be able to be tilted, and which supports the back of the vehicle occupant; and a head rest 16 which is provided at the upper end portion of the seat back 14 so as to be able to be adjusted up and down, and which supports the head portion of the vehicle occupant. Further, the seat cushion 12 has a seat cushion frame 18 which structures the skeleton portion of the seat cushion 12, and the seat back 14 has a seat back frame 20 which structures the skeleton portion of the seat back 14. Note that an elastically deformable seat back pad (not shown) is mounted to the seat back frame 20, and the surface of the seat back pad is covered by a surface covering material (not shown).

The seat back frame 20 has side portions (side frames) 22, which are disposed in the transverse direction (the direction of arrow 14W) side portions of the seat back 14 and extend in the heightwise direction (the direction of arrow 14H) at the seat back 14, and a top portion (top frame) 24, which is disposed along the transverse direction of the seat back 14 (the direction of arrow 14W) in the upper end portion of the seat back 14 and is connected to the side portions 22, such that the seat back frame 20 is formed in a substantial U-shape overall.

The top portion 24 is formed by folding a pipe member into a substantial U-shape, and the both end portions thereof are securely mounted to the side portions 22 by arc welding. Supporting tube portions 26 are arc-welded near the seat back 14 transverse direction (arrow 14W direction) center of the top portion 24, and stays (not shown) for the heat rest 16 can be inserted into and removed from the supporting tube portions 26.

Figure 2:
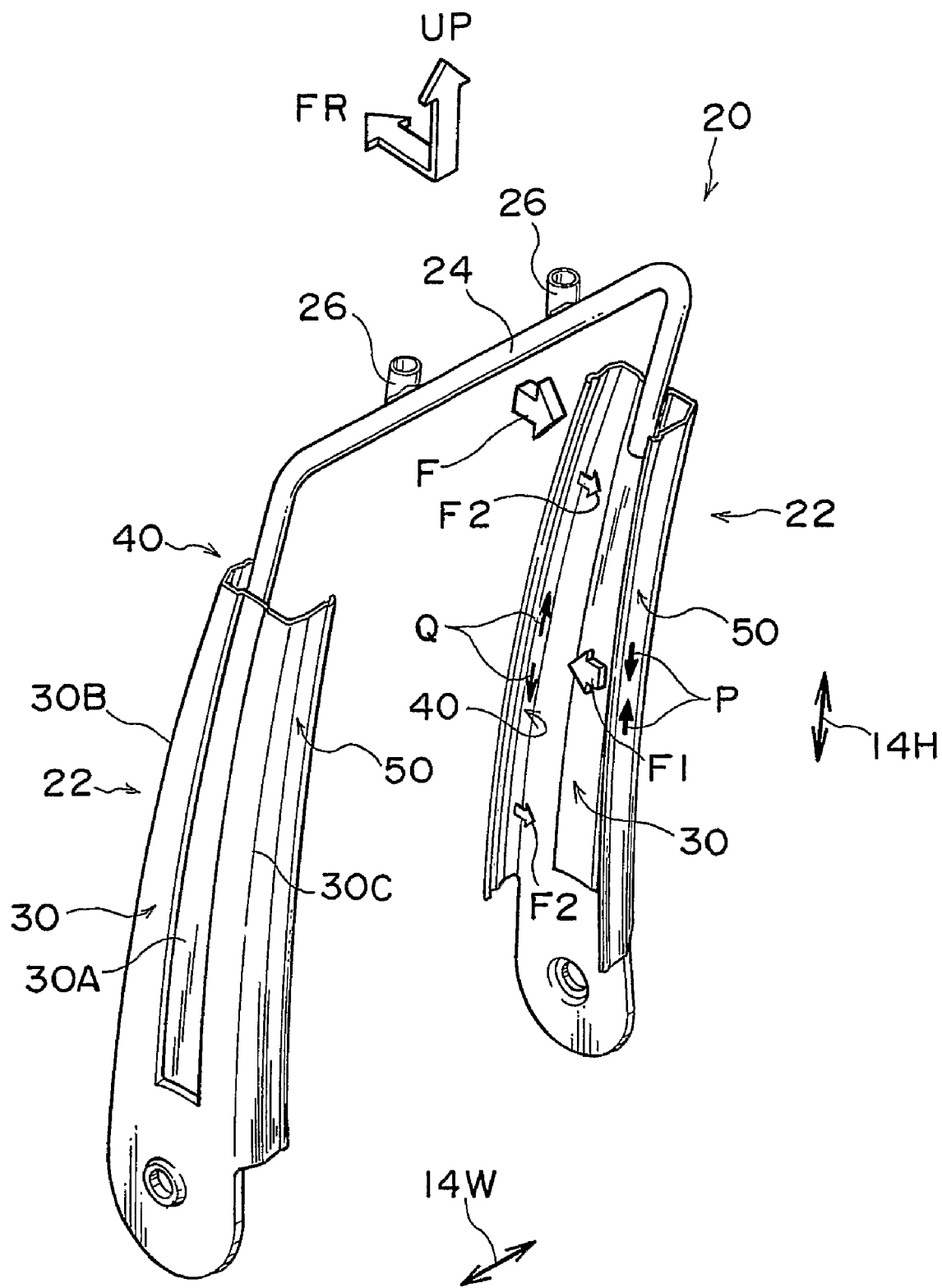
FIG. 2 is a perspective view showing the seat back frame for a vehicle relating to the embodiment of the present invention.

As shown in FIG. 1 and FIG. 2, the side portion 22 is formed by folding a plate member over by press molding, and has a frame side plate portion 30 which makes a plane including the seat front-back direction and the seat heightwise direction be a general surface 30A, i.e., a frame side plate portion which extends in the seat front-back direction and heightwise direction and generally includes a plane which is approximately parallel to the both directions, and a front flange portion 40 extending toward the seat back inner side from a front end portion 30B of the frame side plate portion 30, and a rear flange portion 50 extending toward the seat back inner side from a rear end portion 30C of the frame side plate portion 30. Accordingly, the pair of the left and right side portions 22 have substantially U-shaped, open cross-sections. Note that the both end portions of the aforementioned top portion 24 are welded to the upper portions of the side portions 22 at the inner sides of the open cross-sections. The heightwise direction (the same direction as the direction of arrow 14H) intermediate portion of the side portion 22 as seen in side view is slightly warped in a direction of being convex toward the vehicle front side.

Figure 3:
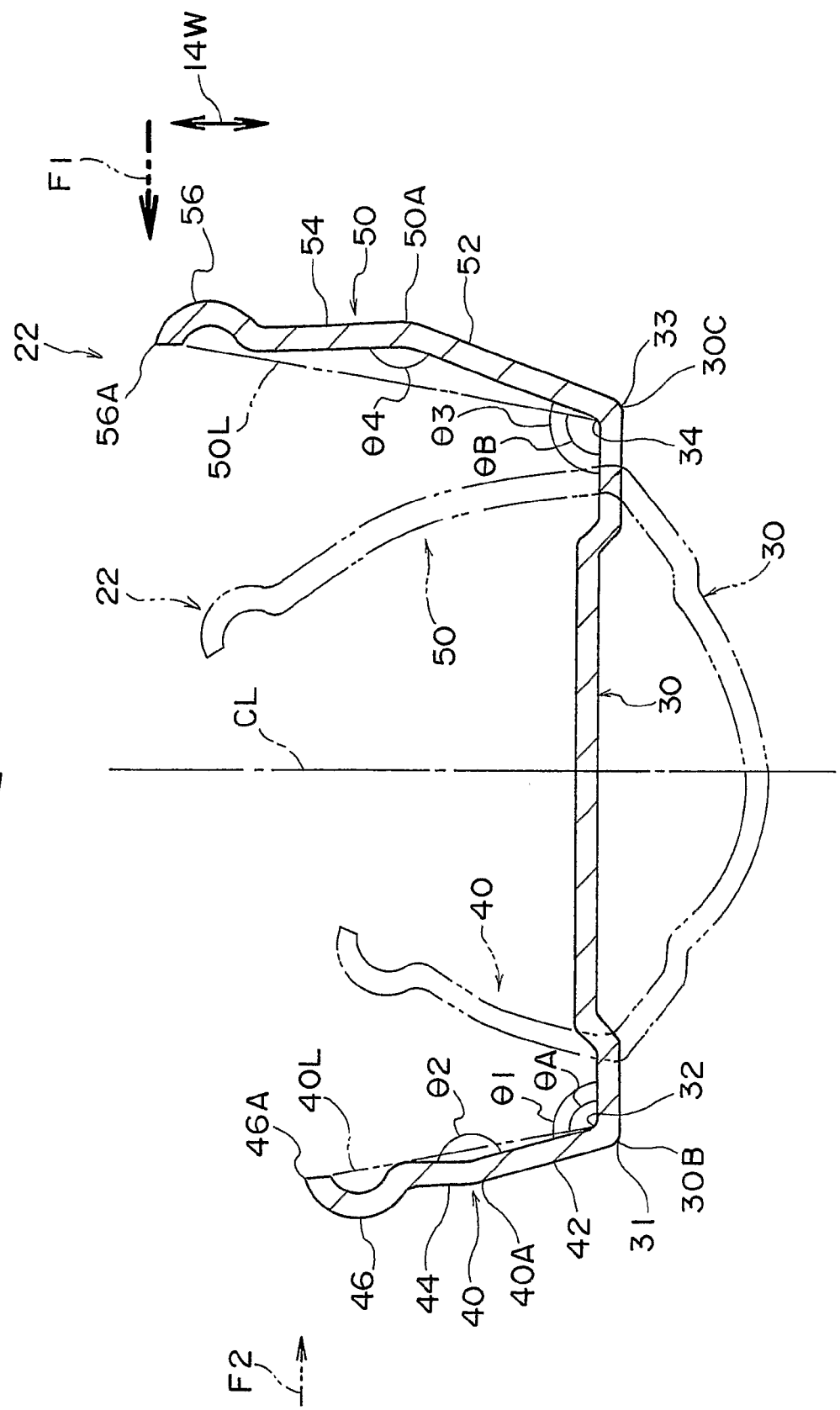
FIG. 3 is a cross-sectional view showing a cross-section along line 3-3 of FIG. 1.

As shown in FIG. 3 which is a horizontal cross-section of the side portion 22, the front flange portion 40 has a front first extending portion 42, which is bent at an obtuse angle from the frame side plate portion 30 toward the seat back inner side (the inner side in the transverse direction (the direction of arrow 14W) at the seat back 14) and extends to a vicinity of the central portion (the portion which is substantially the center) of the front flange portion 40, and a front second extending portion 44, which is bent and extends from the front first extending portion 42 toward the seat back inner side at an obtuse angle. Namely, a bending angle $\theta 1$ at a bent portion 31 which is bent from the frame side plate portion 30 toward the front first extending portion 42 is an obtuse angle, and a bending angle $\theta 2$ at a bent portion 40A which is bent from the front first extending portion 42 toward the front second extending portion 44 also is an obtuse angle. Note that the bent portion 31 and the bent portion 40A are formed to be curved, i.e., so as to have substantially curved surfaces. Further, the front flange portion 40 has a final end portion 46 (undercut portion) which extends from the front second extending portion 44 and is curved in the shape of an arc which is concave toward the vehicle rear side.

Here, the front first extending portion 42 and the front second extending portion 44 form a convex shape which is convex toward the vehicle front side (the outer side of the open cross-section). Further, an angle $\theta A$ formed by the frame side plate portion 30 and a first imaginary line 40L, which connects a bent inner side portion 32 from the frame side plate portion 30 to the front flange portion 40 and a distal end portion 46A of the front flange portion 40 (i.e., the distal end portion 46A of the final end portion 46), is an obtuse angle.

The rear flange portion 50 has a rear first extending portion 52, which is bent at an obtuse angle from the frame side plate portion 30 toward the seat back inner side (the inner side in the transverse direction (the direction of arrow 14W) at the seat back 14) and extends to a vicinity of the central portion (the portion which is substantially the center) of the rear flange portion 50, and a rear second extending portion 54, which is bent and extends from the rear first extending portion 52 toward the seat back inner side at an obtuse angle. Namely, a bending angle $\theta 3$ at a bent portion 33 which is bent from the frame side plate portion 30 toward the rear first extending portion 52 is an obtuse angle, and a bending angle $\theta 4$ at a bent portion 50A which is bent from the rear first extending portion 52 toward the rear second extending portion 54 is an obtuse angle (in the present embodiment, $160° \leq \theta 4 \leq 170°$). Note that the bent portion 33 and the bent portion 50A are formed to be curved, i.e., so as to have substantially curved surfaces. Further, the rear flange portion 50 has a final end portion 56 (undercut portion) which extends from the rear second extending portion 54 and is curved in the shape of an arc which is concave toward the vehicle front side.

Here, the rear first extending portion 52 and the rear second extending portion 54 form a convex shape which is convex toward the vehicle rear side (the outer side of the open cross-section). Further, an angle $\theta B$ formed by the frame side plate portion 30 and a second imaginary line 50L, which connects a bent inner side portion 34 from the frame side plate portion 30 to the rear flange portion 50 and a distal end portion 56A of the rear flange portion 50 (i.e., the distal end portion 56A of the final end portion 56), is an obtuse angle. In other words, the distal end portion 56A of the rear flange portion 50 is provided at a position which is toward the seat back rear side, as compared with the bent inner side portion 34 from the frame side plate portion 30 to the rear flange portion 50.

In order to ensure strength with respect to torsion, the rear flange portions 50 are set to be long. Because the front flange portions 40 are disposed at the both sides of the back side of the vehicle occupant in a seated state, in the present embodiment, the front flange portions 40 are set to be short as compared with the rear flange portions 50.

Operation Of The Embodiment

Operation of the above-described embodiment will be described next.

At the seat 10 for a vehicle shown in FIG. 1, in a case in which a relatively large load F toward the rear of the vehicle is applied to the seat back frame 20 at the time of a rear collision, as shown in FIG. 2, compressive stress P arises at the intermediate portion in the heightwise direction (the same direction as the direction of arrow 14H) at the rear flange portion 50, and tensile stress Q arises at the intermediate portion in the heightwise direction (the same direction as the direction of arrow 14H) at the front flange portion 40. In this way, a large load F1 acts toward the vehicle front side on the heightwise direction intermediate portion of the rear flange portion 50 in accordance with the warped configuration of the side portion 22, and a load F2 which is smaller than the load F1 acts toward the vehicle rear side on the heightwise direction upper and lower portions of the front flange portion 40.

As a result, the large load F1, which acts on the heightwise direction intermediate portion of the rear flange portion 50 shown in FIG. 3, acts as a bending moment which attempts to bend the rear flange portion 50 toward the frame side plate portion 30 (force attempting to collapse the rear flange portion 50 toward the inner side of the open cross-section of the side portion 22). The load F2, which acts on the heightwise direction upper and lower portions of the front flange portion 40, acts as a bending moment which attempts to bend the front flange portion 40 toward the frame side plate portion 30 (force attempting to collapse the front flange portion 40 toward the inner side of the open cross-section of the side portion 22).

Here, with regard to the rear flange portion 50, not only does the rear first extending portion 52 bend and extend from the frame side plate portion 30 toward the seat back inner side at an obtuse angle, but also, the rear second extending portion 54 bends and extends from the rear first extending portion 52 further toward the seat back inner side in a vicinity of the central portion of the rear flange portion 50, and the angle θB is an obtuse angle. Therefore, at the heightwise direction intermediate portion, even if the large load F1 is applied, it is difficult for the rear flange portion 50 to bendingly deform toward the frame side plate portion 30 (the inner side of the open cross-section). Further, with regard to the front flange portion 40 as well, at the heightwise direction upper and lower portions, even if the load F2 is applied, it is similarly difficult for the front flange portion 40 to bendingly deform toward the frame side plate portion 30 (the inner side of the open cross-section).

In this way, even if the load F1 and the load F2 are applied, it is difficult for cross-sectional collapsing, in which there is bending toward the inner side of the open cross-section, of the side portion 22 to arise. Therefore, the load F1 and the load F2 can be effectively supported at the frame side plate portion 30.

In this way, in a case in which the load F (see FIG. 2) is extremely large, as shown by the side portion 22 of the two-dot chain line in FIG. 3, the side portion 22 bendingly deforms from the central portion of the frame side plate portion 30 (the center line of the side portion 22 in the cross-section of FIG. 3 is denoted by CL), and, at the portions of the side portion 22 other than the central portion of the frame side plate portion 30, the cross-sectional configuration shown in FIG. 3 is maintained to the end and hardly deforms at all. In other words, this is a structure which uses the cross-section coefficient to the maximum limit, and, until before the frame side plate portion 30 shown in FIG. 2 bends, the side portion 22 of the seat back frame 20 does not buckle, and can efficiently utilize the proof stress of the side portion 22. In this way, the buckling of the side portion 22 ends in the bending mode (buckling mode) of the frame side plate portion 30 shown by the two-dot chain line in FIG. 3.

As described above, in accordance with the seat back frame 20 of the present embodiment, the amount of bending deformation at the time of a rear collision can be suppressed and the safety of the vehicle occupant can be ensured, merely by changing the configuration of the side portions 22 of the seat back frame 20 and without mounting a reinforcing member or the like, i.e., without leading to an increase in weight.

Further, in a case of forming the side portion 22 which has bending strength equivalent to that of a seat back frame side portion in a conventional, simply substantially U-shaped structure, the unfolded length of the plate member can be greatly (about 15%) shortened, and therefore, a decrease in costs can be aimed for.

Moreover, even in molding the undercut portions such as the final end portions 46, 56, conventionally, there is the need for the additional processes of shift-bending and of pressing after the angle change. However, by employing the present configuration, pre-bending is possible, and the processes also can be shortened.

Another Embodiment

In the above-described embodiment, as shown in FIG. 3, the front flange portion 40 has the front first extending portion 42 and the front second extending portion 44, and the rear flange portion 50 has the rear first extending portion 52 and the rear second extending portion 54. However, for example, there may be a structure in which the front flange portion 40 is not provided with the front first extending portion 42 and the front second extending portion 44 and is merely a flange, and only the rear flange portion 50 is provided with the rear first extending portion 52 and the rear second extending portion 54. Or, there may be a structure in which the rear flange portion 50 is not provided with the rear first extending portion 52 and the rear second extending portion 54 and is merely a flange, and only the front flange portion 40 is provided with the front first extending portion 42 and the front second extending portion 44. Note that, because the large load F1 acts on the heightwise direction intermediate portion at the rear flange portion 50 at the time of a rear collision, a structure in which at least the rear flange portion 50 is provided with the rear first extending portion 52 and the rear second extending portion 54 is preferable.

Moreover, in the above-described embodiment, as shown in FIG. 1 and FIG. 2, the seat back frame 20 is formed in a substantially U-shaped configuration in which the top portion 24 which is a separate body is welded to the side portions 22. However, for example, a seat back frame may be structured by folding a plate member, which has the cross-sectional configuration of the side portion 22 shown in FIG. 3, into a substantial U shape. Namely, the seat back frame for a vehicle may be structured so as to further have a top frame which is disposed along a transverse direction of the seat back in an upper end portion of the seat back, and is connected to the frame side plate portion, wherein the top frame has a frame upper plate portion which includes a plane extending substantially in the seat front-back direction, and flange portions extending toward the seat back inner side from a front end portion and a rear end portion of the frame top plate portion respectively, and at least one of the front and rear flange portions has a first extending portion bent at an obtuse angle from the frame upper plate portion toward the seat back inner side and extending to a vicinity of a central portion of the flange portion, and a second extending portion bent and extending from the first extending portion toward the seat back inner side.

Further, the number of places of bending at the flange portion is not limited to the number in the above-described embodiment such as, for example, a third extending portion which bends and extends from the second extending portion toward the seat back inner side may be provided, or the like.

INDUSTRIAL APPLICABILITY

The present invention can be applied to the frame of a seat back of a seat for a vehicle, and can provide a seat back frame for a vehicle which can suppress the amount of bending deformation of a frame at the time of a rear collision without leading to an increase in weight.

DESCRIPTION OF THE REFERENCE NUMERALS 14 seat back
14W transverse direction of seat back
20 seat back frame (seat back frame for vehicle)
22 side portion
30 frame side plate portion
30A general surface
30B front end portion
30C rear end portion
32 bent inner side portion
34 bent inner side portion
40 front flange portion (flange portion)
40L first imaginary line (imaginary line)
42 front first extending portion (first extending portion)
44 front second extending portion (second extending portion)
46A distal end portion of front flange portion (distal end portion of flange portion)
50 rear flange portion (flange portion)
50L second imaginary line (imaginary line)
52 rear first extending portion (first extending portion)
54 rear second extending portion (second extending portion)
56A distal end portion of rear flange portion (distal end portion of flange portion)

The invention claimed is:

1. A seat back frame for a vehicle comprising:
a frame side plate portion, which is disposed in a transverse direction side portion at a seat back and generally includes a plane which is parallel to a seat front-back direction; and
flange portions extending toward a seat back inner side from a front end portion and a rear end portion of the frame side plate portion respectively, wherein at least one of the front and rear flange portions includes a first extending portion bent at an obtuse angle from the frame side plate portion toward the seat back inner side, and extending to a vicinity of a central portion of the flange portion, and a second extending portion bent and extending from the first extending portion toward the seat back inner side,
wherein
the at least one of the front and rear flange portions extends such that an angle formed by the frame side plate portion and an imaginary line, which connects a distal end portion of the flange portion and a bent inner side portion from the frame side plate portion toward the flange portion, is an obtuse angle, and the second extending portion is bent so as to form an obtuse angle toward the seat back inner side with respect to the first extending portion.

2. The seat back frame for a vehicle of claim 1, wherein the at least one flange portion includes the rear flange portion.

3. The seat back frame for a vehicle of claim 1 wherein the second extending portion has, at a side opposite the first extending portion, a final end portion which extends from the second extending portion and is curved in an arc shape so as to swell toward a seat back outer side.

4. The seat back frame for a vehicle of claim 1, wherein the at least one flange portion has a third extending portion which is bent and extends from the second extending portion toward the seat back inner side.

5. The seat back frame for a vehicle of claim 1, wherein a bent portion between the frame side plate portion and the first extending portion, and a bent portion between the first extending portion and the second extending portion, are formed to have substantially curved surfaces.

6. The seat back frame for a vehicle of claim 1, further having a top frame which is disposed along a transverse direction of the seat back in an upper end portion of the seat back, and is connected to the frame side plate portion, wherein the top frame has a frame upper plate portion which includes a plane extending substantially in the seat front-back direction, and flange portions extending toward the seat back inner side from a front end portion and a rear end portion of the frame top plate portion respectively, and at least one of the front and rear flange portions has a first extending portion bent at an obtuse angle from the frame upper plate portion toward the seat back inner side and extending to a vicinity of a central portion of the flange portion, and a second extending portion bent and extending from the first extending portion toward the seat back inner side.

* * * * *